(12) United States Patent
Kruglick

(10) Patent No.: US 8,856,301 B2
(45) Date of Patent: Oct. 7, 2014

(54) TRAFFIC MODELING OF OVERLAID NETWORKS

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 300 days.

(21) Appl. No.: 12/999,561

(22) PCT Filed: Sep. 7, 2010

(86) PCT No.: PCT/US2010/047960
§ 371 (c)(1),
(2), (4) Date: Dec. 16, 2010

(87) PCT Pub. No.: WO2012/033480
PCT Pub. Date: Mar. 15, 2012

(65) Prior Publication Data
US 2012/0059920 A1    Mar. 8, 2012

(51) Int. Cl.
*G06F 15/173* (2006.01)
*G06F 15/16* (2006.01)
*H04W 16/22* (2009.01)
*H04W 16/32* (2009.01)

(52) U.S. Cl.
CPC .............. *H04W 16/22* (2013.01); *H04W 16/32* (2013.01)
USPC ........................................... 709/223; 709/249

(58) Field of Classification Search
USPC ......................................................... 709/223
See application file for complete search history.

(56) References Cited

U.S. PATENT DOCUMENTS

| 7,499,432 | B2* | 3/2009 | Guo et al. | 370/332 |
| 7,894,361 | B1* | 2/2011 | Bhan et al. | 370/252 |
| 8,106,792 | B2* | 1/2012 | Chen et al. | 340/905 |
| 2004/0032857 | A1* | 2/2004 | Tannan | 370/351 |
| 2007/0160007 | A1* | 7/2007 | Wang et al. | 370/331 |

OTHER PUBLICATIONS

Huang, Qiaqn, et al. (Nov. 2009). Performance modeling for heterogeneous wireless networks with multiservice overflow traffic. In Global Telecommunications Conference, 2009. GLOBECOM 2009. IEEE (pp. 1-7). IEEE.*
Koksal, Murat. (Oct. 22, 2008). A Survey of Network Simulators Supporting Wireless Networks. Retrieved from: http://www.ceng.metu.edu.tr/~e1595354/A%20Survey%20of%20Network%20Simulators%20Supporting%20Wireless%20Networks.pdf.*
Mohanty, Shantidev, et al. (Aug. 14, 2006). Performance analysis of a novel architecture to integrate heterogeneous wireless systems. Computer Networks, 51(4), 1095-1105.*
Son, Hyukmin, et al. (Jul. 2008). Soft Load Balancing Over Heterogeneous Wireless Networks. Vehicular Technology, IEEE Transactions on, 57(4), 2632-2638.*
Orlik, Philip, et al. (2001). On the handoff arrival process in cellular communications. Wireless Networks, 7(2), 147-157.*
International Search Report for International Application No. PCT/US2010/47960, ISA/AU, mailed on Oct. 21, 2010.

(Continued)

*Primary Examiner* — Lynn Feild
*Assistant Examiner* — Timothy Sowa
(74) *Attorney, Agent, or Firm* — Brundidge & Stanger, P.C.

(57) ABSTRACT

Implementations and techniques for traffic modeling of overlaid networks are generally disclosed. For example, simulating behavior of a first wireless network including an estimated user migration from the first wireless network to a second wireless network based in part on received traffic information associates with the first wireless network and the second wireless network are generally disclosed.

18 Claims, 6 Drawing Sheets

(56) References Cited

OTHER PUBLICATIONS

Song, Q. and Jamalipour, A., "A Time-Adaptive Vertical Handoff Decision Scheme in Wireless Overlay Networks", 2006 IEEE 17th International Symposium on Personal, Indoor and Mobile Radio Communication, Sep. 11-14, 2006, pp. 1-5.

C. Bruno et al., 3GPP LTE and LTE-Advanced, EURASIP Journal on Wireless Communications and Networking 2009.

N. Sah et al., Impact of clutters on quality of service in mobile communication using Walfisch-Ikegami propagation model, IEEE International Conference on Personal Wireless Communications, 2005, pp. 290-294.

S. Mahmoud et al., A Hyperbolic-Uniform Space-Time Channel Model for Mobile Environment with Uniform Linear Antenna Array, in Australian Telecommunications, Networks and Applications Conference, Dec. 8-10, 2003, Southbank, Melbourne as accessed on Dec. 13, 2010 at http://eprints.qut.edu.au/155/1/Mahmoud_Hyperbolic.pdf.

X. Zeng et al., GloMoSim: a library for parallel simulation of large-scale wireless networks, ACM SIGSIM Simulation Digest 28, No. 1 (1998), pp. 154-161.

K. Tutschku et al., Spatial traffic estimation and characterization for mobile communication network design, IEEE Journal on Selected Areas in Communications 16, No. 5 (1998), pp. 804-811.

E. A. Brewer et al., "A network architecture for heterogeneous mobile computing," IEEE Personal Communications Magazine 5, No. 5 (1998): 8-24.

Y.-C. Chen et al., Advanced seamless vertical handoff architecture for WiMax and WiFi heterogenous networks with QoS guarantees, Computer Communications, vol. 32 (2009), pp. 281-293.

N. Poojary et al., Medium access control in a network of ad hoc mobile nodes with heterogeneous power capabilities, in IEEE International Conference on Communications (ICC) (Citeseer, 2001), pp. 872-877.

Chi, V. et al, "V_HAND: Simulator for Behavior Modeling of Mobile Nodes between Heterogeneous Networks". IJCSNS International Journal of Computer Science and Network Security, vol. 7, No. 12, Dec. 2007, p. 222-227.

Gowrishankar, G.N. et al., Analytic Performability Model of Vertical Handoff in Wireless Networks, Journal of Computer Science 5(6): 445-450, (2009), p. 445-450.

\* cited by examiner

600 A computer program product.

602 A signal bearing medium.

604 at least one of one or more instructions for receiving traffic information associated with a first wireless network and a second wireless network;

one or more instructions for simulating behavior of the second wireless network in response to the traffic information;

one or more instructions for simulating behavior of the first wireless network in response to the traffic information and in response to the simulated behavior of the second wireless network;

one or more instructions for estimating user migration from the second wireless network to the first wireless network;

one or more instructions for adjusting one or more network control parameters in response to the simulated behavior of the first wireless network;

one or more instructions for simulating channel performance;

one or more instructions for simulating second behavior of the second wireless network in response to the simulated behavior of the first wireless network;

one or more instructions for estimating user migration from the first wireless network to the second wireless network; or one or more instructions for simulating behavior of the first wireless network in response to an expected migration of users from the second wireless network to the first wireless network.

| 606 a computer-readable medium. | 608 a recordable medium. | 610 a communications medium. |

FIG. 6

TRAFFIC MODELING OF OVERLAID NETWORKS

BACKGROUND

Unless otherwise indicated herein, the approaches described in this section are not prior art to the claims in this application and are not admitted to be prior art by inclusion in this section.

Modeling of mobile networks often includes modeling of user traffic trends. Network traffic has typically been predicted based on historical traffic levels while traffic losses have been separately predicted based on conditions. Modeling of next generation networks, where substantial flows of traffic may be influenced by events on other networks, may require different modeling schemes. For example, a network operating under the Institute of Electrical and Electronics Engineers (IEEE) 802.16 family of standards may run at 2.3, 2.5, or 3.5 GHz. Each of these frequencies may experience a different amount of loss associated with a separate, overlaid network such as a 3GPP Long Term Evolution (LTE) network.

SUMMARY

In accordance with some implementations, methods for traffic modeling of overlaid networks may generally include receiving traffic information associated with two overlaid wireless networks, simulating behavior of the two wireless networks using the traffic information, and simulating behavior of one of the wireless networks again using the traffic information and the simulated behavior of the other wireless network. Simulating behavior of a wireless network may include estimating user migration from the wireless network to the other wireless network. The two wireless networks may be heterogeneous overlaid networks configured to support different wireless communications standards.

In accordance with some implementations, articles including a computer program product are also generally described where the products store instructions that, if executed, may result in receiving traffic information associated with two overlaid wireless networks, simulating behavior of the two wireless networks using the traffic information, and simulating behavior of one of the wireless networks again using the traffic information and the simulated behavior of the other wireless network. Simulating behavior of a wireless network may include estimating user migration from the wireless network to the other wireless network. The two wireless networks may be configured to support different wireless communications standards.

In accordance with some implementations, systems are generally described that may include network management modules configured to receive traffic information associated with two overlaid wireless networks, simulate behavior of the two wireless networks using the traffic information, and simulate behavior of one of the wireless networks again using the traffic information and the simulated behavior of the other wireless network. Simulating behavior of a wireless network may include estimating user migration from the wireless network to the other wireless network. The two wireless networks may be configured to support different wireless communications standards.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 is an illustration of an example computer program product; and

DETAILED DESCRIPTION

Figure 1:
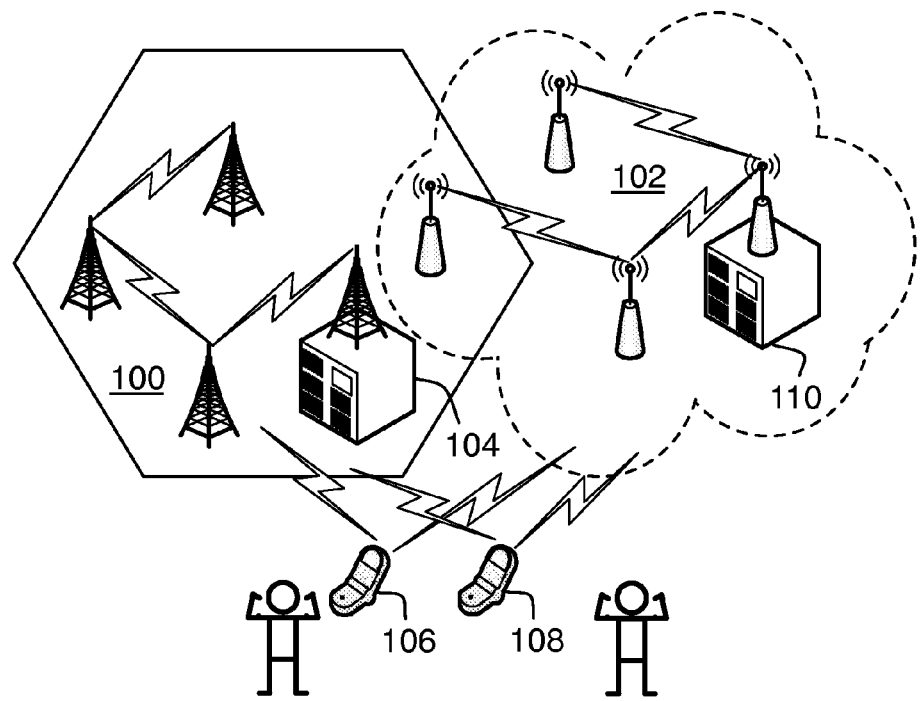
FIG. 1 is an illustrative diagram of an example system.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to user traffic modeling of overlaid networks.

In accordance with various implementations of the present disclosure, modeling of a mobile or wireless network may consider the effect on traffic conditions of users migrating to the network via vertical handoff from another overlaid network or networks. For example, modeling of the effects of changes in environmental conditions on traffic in one network, for instance the impact of weather on that network, may also consider the effects of those same conditions on other, overlaid networks and how the effects on the overlaid networks can also impact the network being modeled. For example, the same weather conditions may create the potential for a vertical handoff influx of users from an overlaid network that may be more affected by those conditions than the network being modeled. Thus, traffic modeling in accordance with various implementations of the present disclosure may take into account the differential impact of changing conditions on overlaid networks that may prompt user population migration and may lead to nonlinear congestion impact on a modeled network.

In accordance with various implementations of the present disclosure, co-simulation of overlaid networks may be employed so that the impact of a given set of conditions may also be evaluated on an overlaid network to assess the potential that larger numbers of users may migrate to or from the overlaid network in conjunction with changes in channel performance. For example, in simulating a 4G network overlaid with a Institute of Electrical and Electronics Engineers (IEEE) 802.16 network, the impact of weather conditions on both the 4G network and the IEEE 802.16 network may be co-simulated and migrations of users from one network to the other may be modeled along with location and/or other dependencies.

FIG. 1 illustrates an example of a system of overlaid wireless communication networks 100 and 102 that may be simulated in accordance with at least some embodiments of the present disclosure. In various implementations, networks 100 and 102 may be heterogeneous wireless networks. For example, network 100 may facilitate wireless communications in accordance with the IEEE 802.16 standard, while network 102 may facilitate wireless communications in accordance with a different standard such as the 3GPP Long Term Evolution (LTE) standard. While FIG. 1 illustrates two overlaid networks 100 and 102, in various examples simulation of network behavior in the context of three or more overlaid networks may be undertaken in accordance with various implementations of the present disclosure.

In various implementations, the effects of traffic conditions on the behavior of one network, for example, network 102, may be incorporated into the simulation of the other network, in this example, network 100. Further, in various implementations, networks 100 and 102 may be co-simulated so that effects of traffic conditions on the behavior of either of networks 100 or 102 may be incorporated into the simulation of the both networks. In other words, for example, the behavior of network 100 under particular traffic conditions may be simulated and that simulated behavior may be incorporated into simulation of the behavior of network 102 under the same or similar traffic conditions. In turn, the corresponding simulated behavior of network 102 may be incorporated into further simulation of the behavior of network 100 under the same or similar traffic conditions, and so on. In various implementations, such co-simulation of two or more overlaid networks may be carried out through multiple iterations until, for example, under any of various known relaxation techniques, a stable solution has been reached.

As shown in FIG. 1, network 100 may include a network management module (NMM) 104 for managing wireless communications within network 100 and/or between network 100 and two example user devices 106 and 108 configured to communicate wirelessly via network 100. Network 102 may also include an NMM 110 for managing wireless communications within network 102 and/or between network 102 and user devices 106 and 108 that may also be configured to communicate wirelessly via network 102.

In accordance with the present disclosure, as will be explained in greater detail below, NMM 104 and/or NMM 110 may be configured to estimate behavior of both wireless networks 100 and 102. For example, in various implementations, NMM 104 may be configured to estimate vertical migration of users from network 102 to network 100 and/or from network 102 to network 100 based, at least in part, on traffic information. Traffic information may include data specifying traffic conditions such as atmospheric conditions, interferer characteristics, etc. that may impact channel performance in both networks 100 and 102. In addition, traffic information may also include data specific to each network such as initial user population, channel utilization, classes of active devices, etc.

Figure 2:
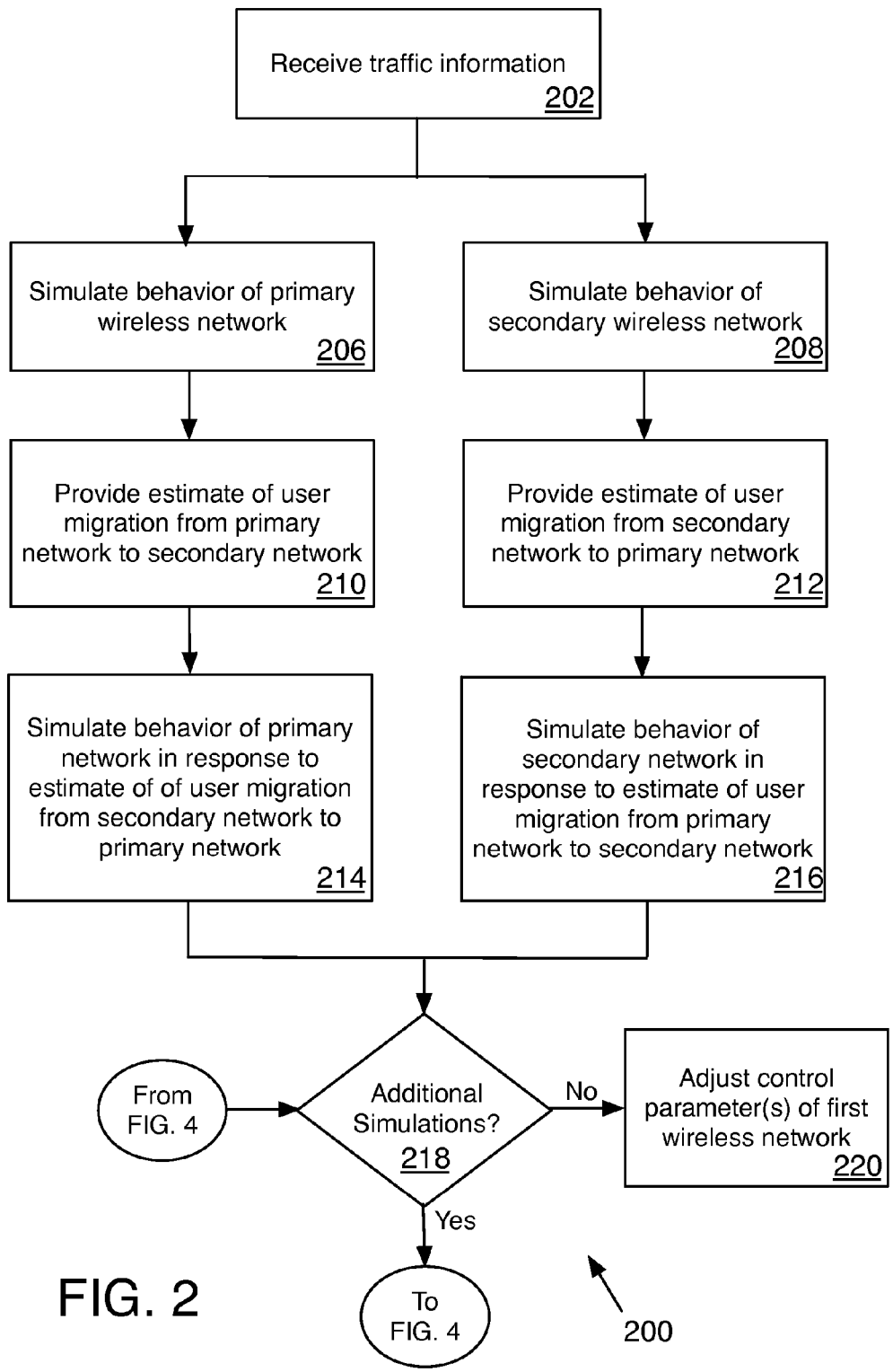
FIGS. 2 and 4 are illustrations of an example process for modeling of overlaid networks.

FIG. 2 illustrates a flow diagram of an example process 200 for modeling of overlaid networks according to various implementations of the present disclosure. Process 200 may include one or more operations, functions or actions as illustrated by one or more of blocks 202, 206, 208, 210, 212, 214, 216, 218, 220, 222, 224, 226 and/or 228. Process 200 may begin at block 202.

Figure 3:
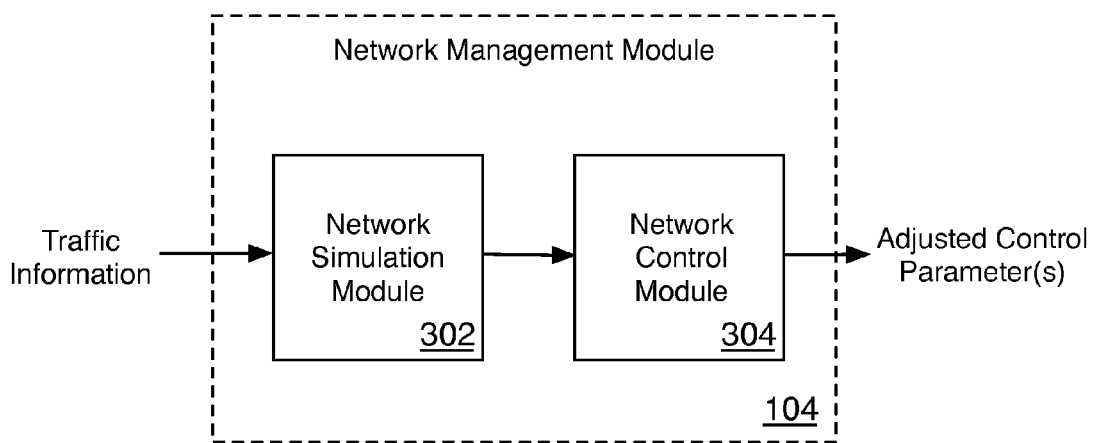
FIG. 3 is an illustrative diagram of a portion of the example system of FIG. 1.

At block 202, traffic information may be received. For example, FIG. 3 illustrates a portion of the system of FIG. 1 including example NMM 104 that may undertake at least portions of process 200 including receiving traffic information in block 202. In various examples, NMM 104 may include at least a network simulation module (NSM) 302 and a Network Control Module (NCM) module 304. In various examples, NSM 302 and/or NCM 304 may be implemented in software, firmware, hardware and/or any combination thereof.

Traffic information received in block 202 may include data specifying traffic conditions affecting networks 100 and/or 102 as well as expected initial user population, channel utilization, classes of active devices, etc., associated with networks 100 and/or 102. In some examples, NSM 302 may receive traffic information in block 202.

At block 206, the behavior of the first or primary wireless network may be simulated based, at least on part, on the traffic information received in block 202. In various implementations, block 206 may involve using known network simulation techniques to assess channel performance. The simulation of block 206 may result in providing, in block 210, an estimate of user migration from the simulated primary network to an overlaid network or secondary network. For example, simulation in block 206 may involve determining probabilities for various devices utilizing network 100 to undergo vertical migration from primary network 100 to secondary network 102 in response to traffic conditions such as heavy rain causing increased channel interference and/or user devices undergoing changes in velocity (e.g., users accelerating from a stop), etc.

Similarly, at block 208, the behavior of the second or secondary wireless network may be simulated based, at least on part, on the traffic information received in block 202. In various implementations, block 208 may involve using known network simulation techniques to assess channel performance. The simulation of block 208 may result in providing, in block 212, an estimate of user migration from the secondary network to the primary network. For example, simulation in block 208 may involve determining probabilities for various devices utilizing network 102, such as device 108, to undergo vertical migration from secondary network 102 to primary network 100 in response to traffic information received in block 202.

At block 214, the behavior of the primary network may be simulated a second time. The simulation of block 214 may be based, at least on part, on a combination of the traffic information received in block 202 and the estimate of user migration from the secondary network to the primary network provided in block 212. For example, if the traffic conditions received in block 202 result in an estimate at block 212 of user migration from network 102 to network 100, then block 214 may involve applying network simulation techniques to assess channel performance in network 100 in response to an estimated number of additional users migrating from network 102 to network 100. In various implementations, the simulation of block 214 may generally involve utilizing the traffic information received in block 202 with the modification that any expected user population of network 100 may be augmented according to the estimated user migration from network 102 to network 100 resulting form the simulation of block 208.

Similarly, at block 216, the behavior of the secondary network may be simulated a second time. The simulation of block 216 may be based, at least on part, on a combination of the traffic information received in block 202 and the estimate of user migration from the primary network to the secondary network provided in block 210. For example, if the traffic conditions received in block 202 and used to simulate network 100 in block 206 result in an estimate of user migration from network 100 to network 102, then block 216 may involve applying network simulation techniques to assess channel performance in network 102 in response to an expected number of users migrating to network 102 from network 100. In various implementations, the simulation of block 216 may generally involve utilizing the traffic information received in block 202 with the modification that any expected user population of network 102 may be augmented according to the estimated user migration from network 100 to network 102 provided in block 210 and resulting from the simulation of block 206.

At block 218 a determination may be made as to whether to undertake additional simulations. If block 218 results in a negative determination then process 200 may conclude with block 220 where control parameters of the primary network may be adjusted. In various implementations, block 220 may include adjusting network parameters in response to the simulation undertaken in blocks 214 and/or 216. For example, if the simulation of block 214 results in a determination that estimated user migration from network 102 to network 100 may result in non-linear congestion degrading channel performance in network 100, then block 220 may involve the adjustment of one or more network control parameters to offset the impact resulting from user migration from network 102 to network 100.

For instance, referring to the example of FIG. 3, NCM 304 may implement block 220 by adjusting one or more network control parameters in response to simulations undertaken in process 200 by NSM 302. In various implementations, network control parameters adjusted in block 220 may include parameters associated with network Quality of Service (QoS) where QoS may be defined as the ability to provide different priority to different applications, users, or data flows, or to guarantee a certain level of performance to a data flow in a network. For example, undertaking block 220 may include NCM 304 adjusting one or more control parameters to permit, for example, lower priority queues to temporarily borrow bandwidth from higher priority queues.

Figure 4:
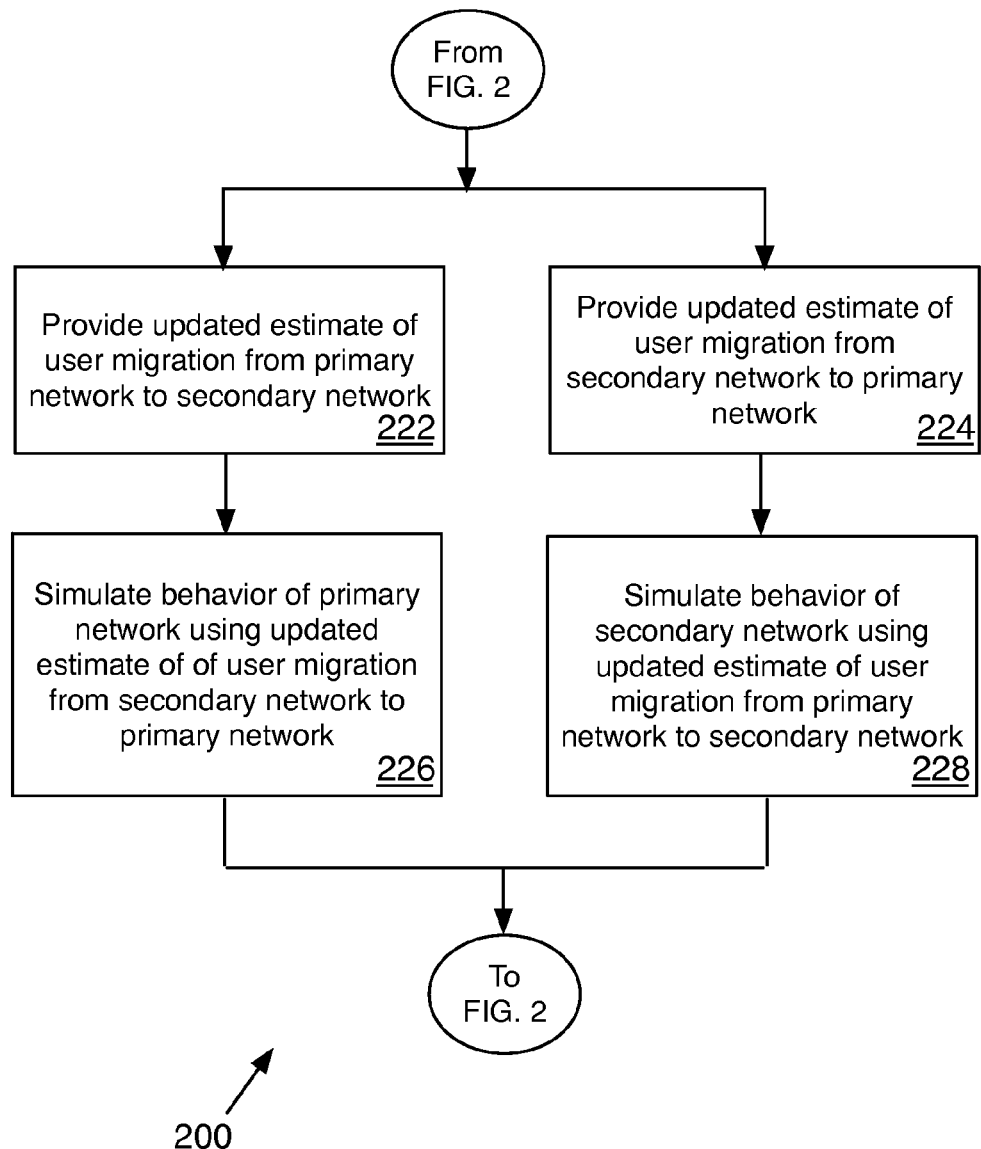

If, on the other hand, block 218 results in a positive determination then process 200 may continue with additional simulations. FIG. 4 illustrates a flow diagram of additional blocks of process 200 for modeling of overlaid networks according to various implementations of the present disclosure including one or more operations, functions or actions as illustrated by one or more of blocks 222, 224, 226 and/or 228. Process 200 may continue at block 222.

At blocks 222 and 224, respective updated estimates of user migration from the primary network to the secondary network and from the secondary network to the primary network may be provided. For example, block 222 may involve providing an updated estimate of user migration from the primary network to the secondary network based on the simulation undertaken in block 214, while block 224 may involve providing an updated estimate of user migration from the secondary network to the primary network based on the simulation undertaken in block 216.

At blocks 226 and 228, respective additional simulations of the primary network and the secondary network may be undertaken. For example, block 226 may involve simulating the primary network based, at least on part, on a combination of the traffic information received in block 202 and the updated estimate of user migration from the secondary network to the primary network provided in block 224, while block 228 may involve simulating the secondary network based, at least on part, on a combination of the traffic information received in block 202 and the updated estimate of user migration from the primary network to the secondary network provided in block 222. Process 200 may then continue with a reiteration of block 218 of FIG. 2.

Returning to discussion of FIG. 2, process 200 may continue with a reiteration of block 218 where another determination of whether to undertake additional simulations may be undertaken. If block 218 results in a negative determination then process 200 may conclude at block 220 as described above. If, however, block 218 results in a positive determination, then process 200 may continue with another iteration of one or more of blocks 222, 224, 226 and/or 228 of FIG. 4. In various implementations, the determination of block 218 may be undertaken in response to various known relaxation techniques where a negative determination of block 218 may result if a stable solution has been reached subsequent to the simulations of blocks 226 and 228.

Figure 5:
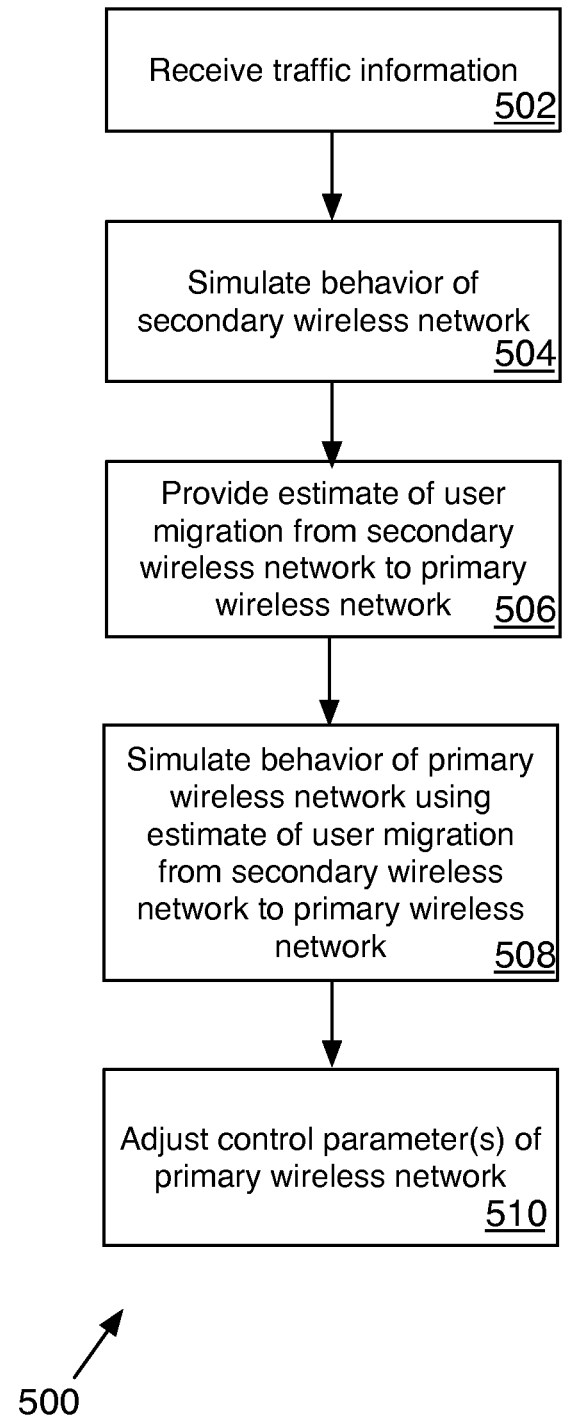
FIG. 5 is an illustration of an example process for modeling of overlaid networks.

While the implementation of example process 200, as illustrated in FIGS. 2 and 4, may include the undertaking of all of blocks 202, 206, 208, 210, 212, 214, 216, 218, 220, 222, 224, 226 and 228, claimed subject matter is not limited in this regard and, in various implementations, implementation of process 200 may include the undertaking only a subset of blocks 202, 206, 208, 210, 212, 214, 216, 218, 220, 222, 224, 226 and/or 228. Thus, for example, in various implementations process 200 may involve undertaking the subset of blocks 202, 208, 212, 214 and 220. For instance, FIG. 5 illustrates a flow diagram of an example process 500 for modeling of overlaid networks according to various implementations of the present disclosure including one or more operations, functions or actions as illustrated by one or more of blocks 502, 504, 506, 508 and/or 510. Process 500 may begin at block 502.

At block 502, traffic information may be received in a manner similar to that described above with respect to block 202 of FIG. 2. Likewise, blocks 504, 506, 508 and 510 may be implemented similarly to respective blocks 202, 208, 212, 214 and 220 as described above for FIG. 2. Thus, process 500 of FIG. 5 may be implemented to model the response of a primary network to the expected migration of users from an overlaid secondary network without undertaking the co-simulation of the response of the secondary network to any expected migration of users from the overlaid primary network.

FIG. 6 illustrates an example computer program product 600 arranged in accordance with at least some examples of the present disclosure. Program product 600 may include a signal bearing medium 602. Signal bearing medium 602 may include one or more instructions 604 that, when executed by, for example, a processor, may provide the functionality described above with respect to FIGS. 2, 4 and 5. Thus, for example, referring to the system of FIG. 1, NMM 104 may undertake one or more of the blocks shown in FIGS. 2, 4 and 5 in response to instructions 604 conveyed by medium 602.

In some implementations, signal bearing medium 602 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, referring to the system of FIG. 1, program product 600 may be wirelessly conveyed to NMM 104 by signal bearing medium 602, where signal bearing medium 602 is conveyed to NMM 104 by a wireless communications medium 610 (e.g., an wireless communications medium conforming with the 802.11 standard).

Figure 7:
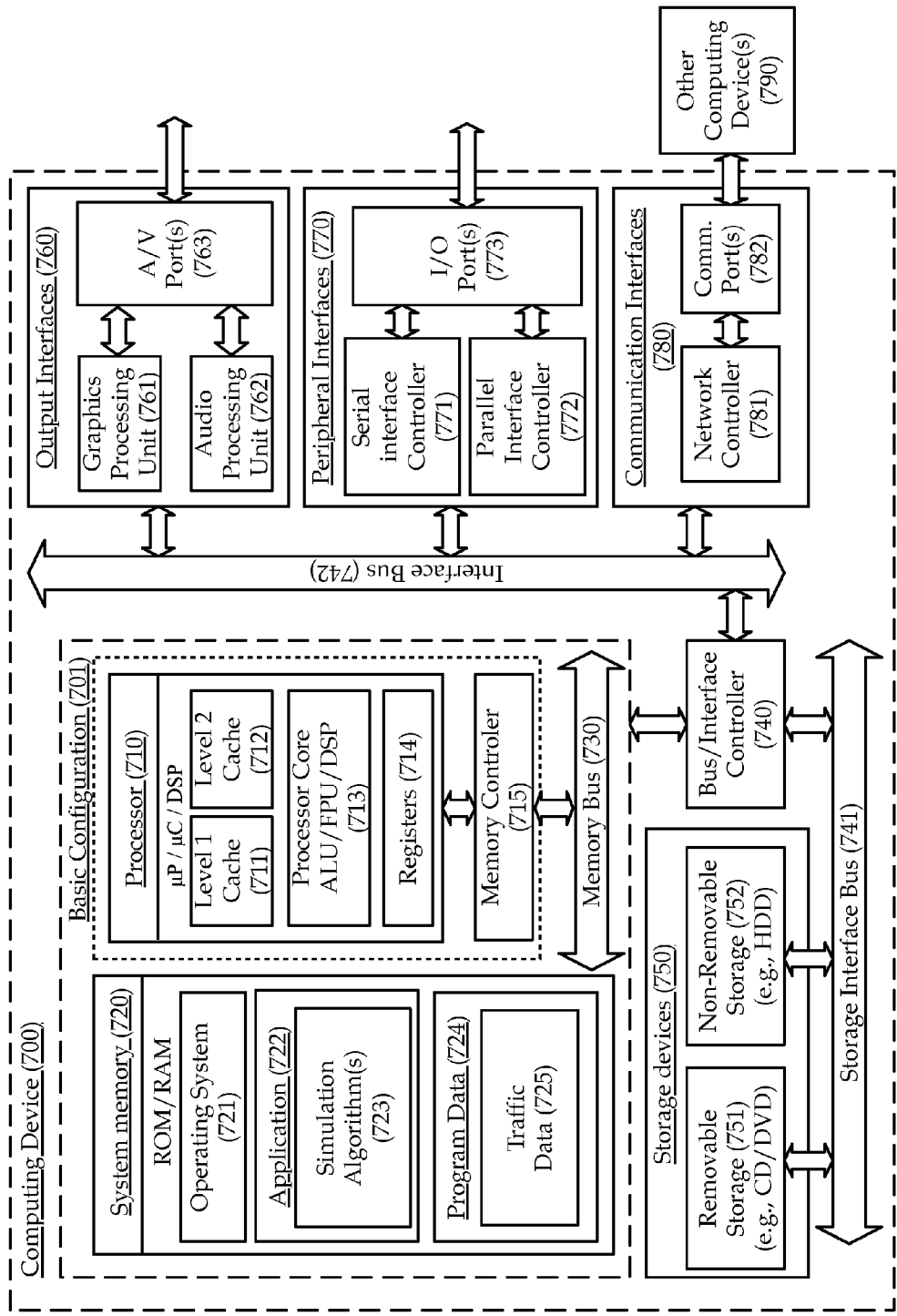
FIG. 7 is an illustration of an example computing device, all arranged in accordance with at least some embodiments of the present disclosure.

FIG. 7 is a block diagram illustrating an example computing device 700. In some examples, computing device 700 may undertake modeling of overlaid networks. In a very basic configuration 701, computing device 700 typically includes one or more processors 710 and system memory 720. A memory bus 730 can be used for communicating between the processor 710 and the system memory 720.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 may include instructions 723 that are arranged to perform the functions as described herein including the actions described with respect to the flow charts shown in FIGS. 2, 4 and 5. Program Data 724 may include traffic data 725 that may be useful for implementing instructions 723. In some examples, application 722 can be arranged to operate with program data 724 on an operating system 721 such that implementations of modeling of overlaid networks, as described herein, may be provided. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 760 include a graphics processing unit 761 and an audio processing unit 762, which can be configured to communicate to various external devices such as a display or speakers via one or more A/V ports 763. Example peripheral interfaces 760 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include an global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for managing a wireless network at a network management module comprising:
   receiving traffic information associated with a first wireless network and a second wireless network,
      wherein the first wireless network is configured in accordance with a first wireless communications standard,
      wherein the second wireless network is configured in accordance with a second wireless communications standard different than the first wireless communications standard, and
      wherein the received traffic information comprises a traffic condition; and
   co-simulating behavior of the first wireless network and behavior of the second wireless network under the traffic condition such that simulated behavior of the first wireless network is incorporated in simulating the behavior of the second wireless network and simulated behavior of the second wireless network is incorporated in simulating the behavior of the first wireless network,
      wherein the simulating the behavior of the second wireless network comprises estimating user migration from the second wireless network to the first wireless network, and
      wherein the simulating the behavior of the first wireless network comprises estimating user migration from the first wireless network to the second wireless network.

2. The method of claim 1, further comprising:
   adjusting one or more network control parameters, wherein the adjustment is based at least in part on the simulated behavior of the first wireless network.

3. The method of claim 1, wherein the traffic information further comprises an expected user population of the first wireless network and an expected user population of the second wireless network.

4. The method of claim 1, wherein the simulating the behavior of the first wireless network comprises simulating behavior of the first wireless network based at least in part on an expected migration of users from the second wireless network to the first wireless network.

5. The method of claim 1, wherein the first wireless network and the second wireless network comprise overlaid heterogeneous wireless networks.

6. The method of claim 1, wherein the co-simulating the behavior of the first wireless network and the behavior of the second wireless network comprises simulating channel performance that is impacted by atmospheric conditions, and wherein the atmospheric conditions include weather elements that increase channel interference associated with at least one of the first wireless network or the second wireless network.

7. An article comprising a non-transitory computer program product having stored therein instructions that, in response to being executed, comprises:
   receiving traffic information associated with a first wireless network and a second wireless network,
      wherein the first wireless network is configured in accordance with a first wireless communications standard,
      wherein the second wireless network is configured in accordance with a second wireless communications standard different than the first wireless communications standard, and wherein the received traffic information comprises a traffic condition; and
co-simulating behavior of the first wireless network and behavior of the second wireless network under the traffic condition such that simulated behavior of the first wireless network is incorporated in simulating the behavior of the second wireless network and simulated behavior of the second wireless network is incorporated in simulating the behavior of the first wireless network,
wherein the simulating the behavior of the second wireless network comprises estimating user migration from the second wireless network to the first wireless network, and
wherein the simulating the behavior of the first wireless network comprises estimating user migration from the first wireless network to the second wireless network.

8. The article of claim 7, further having stored therein instructions that, in response to being executed, comprises:
adjusting one or more network control parameters based at least in part on the simulated behavior of the first wireless network.

9. The article of claim 7, further having stored therein instructions that, in response to being executed, comprises:
simulating second behavior of the second wireless network based at least in part on the simulated behavior of the first wireless network.

10. The article of claim 9, wherein the simulating the behavior of the first wireless network comprises estimating user migration from the first wireless network to the second wireless network.

11. The article of claim 7, wherein the traffic information further comprises an expected user population of the first wireless network and an expected user population of the second wireless network.

12. The article of claim 7, wherein the simulating the behavior of the first wireless network comprises simulating behavior of the first wireless network in response to an expected migration of users from the second wireless network to the first wireless network.

13. The article of claim 7, wherein the first wireless network and the second wireless network comprise overlaid heterogeneous wireless networks.

14. A system comprising:
a processor; and
a network management module communicatively coupled to the processor, wherein the network management module is configured to:
receive traffic information associated with a first wireless network and a second wireless network,
wherein the first wireless network is configured in accordance with a first wireless communications standard,
wherein the second wireless network is configured in accordance with a second wireless communications standard different than the first wireless communications standard, and
wherein the received traffic information comprises a traffic condition,
co-simulating behavior of the first wireless network and behavior of the second wireless network under the traffic condition such that simulated behavior of the first wireless network is incorporated in simulating the behavior of the second wireless network and simulated behavior of the second wireless network is incorporated in simulating the behavior of the first wireless network,
wherein the behavior of the second wireless network is simulated to estimate user migration from the second wireless network to the first wireless network,
wherein the behavior of the first wireless network is simulated to estimate user migration from the first wireless network to the second wireless network, and
adjust network parameters associated with the first wireless network based on a determination associated with the estimated user migration.

15. The system of claim 14, wherein the network management module is further configured to:
adjust one or more network control parameters based in part on the simulated behavior of the first wireless network.

16. The system of claim 14, wherein the network management module is further configured to:
simulate second behavior of the second wireless network based in part on the simulated behavior of the first wireless network.

17. The system of claim 14, wherein the simulating the behavior of the first wireless network comprises estimating user migration from the first wireless network to the second wireless network.

18. The system of claim 14, wherein the determination associated with the user migration results in a non-linear congestion that degrades channel performance associated with the first wireless network.

* * * * *